(12) United States Patent
Lake et al.

(10) Patent No.: US 7,274,372 B1
(45) Date of Patent: Sep. 25, 2007

(54) REAL-TIME DIGITAL THREE DIMENSIONAL ENGRAVING

(75) Inventors: Adam T. Lake, Portland, OR (US);
Carl S. Marshall, Portland, OR (US);
Marc S. Blackstein, Hillsboro, OR (US); Daniel Johnston, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 800 days.

(21) Appl. No.: 09/707,344

(22) Filed: Nov. 6, 2000

(51) Int. Cl.
*G09G 5/00* (2006.01)
(52) U.S. Cl. .................................... 345/582
(58) Field of Classification Search ........ 345/581–588, 345/419, 423, 589; 382/162–167, 173–180
See application file for complete search history.

(56) References Cited

U.S. PATENT DOCUMENTS

| | | | | |
|---|---|---|---|---|
| 4,500,919 A | * | 2/1985 | Schreiber | 358/518 |
| 5,469,535 A | * | 11/1995 | Jarvis et al. | 345/582 |
| 6,023,530 A | * | 2/2000 | Wilson | 382/219 |
| 6,078,331 A | * | 6/2000 | Pulli et al. | 345/423 |
| 6,208,347 B1 | * | 3/2001 | Migdal et al. | 345/419 |
| 6,426,750 B1 | * | 7/2002 | Hoppe | 345/428 |

OTHER PUBLICATIONS

Victor Ostromoukhov, Digital Facial Engraving, Econle Polytechnique Federale de Lausanne, pp. 1-8.*
Anders Kugler, Designing High-Performance Texturing and Rasterization Hardware, Mar. 6, 1997 http://www.gris.uni-tuebingen.de/gris/jb96/node28.html, pp. 1-13.*
Wolfgang Leister, Computer Generated Copper Plates, Mar. 1994, http://www.nr.no/~wolfgang/copper/copper.html, pp. 1-14.*
Wolfgang Leister, Computer Generated Copper Plates, 1994, http://www.eg.org/EG/CGF/Volume13/Issue1/v13i1pp69-77_abstract.pdf, p. 1.*
Victor Ostromoukhov, Digital Facial Engraving, Ecole Polytechnique Federale-de Lausanne (EPFL), http://lspwww.epfl.ch/~victor, Switzerland.

* cited by examiner

*Primary Examiner*—Jeffery A Brier
(74) *Attorney, Agent, or Firm*—Guojun Zhou (57) ABSTRACT

A real-time digital engraving technique gives the appearance of traditional copperplate engraving. The present system accepts a 3D mesh comprising vertex data and applies a novel algorithm to generate a digital engraving image based on the mesh. The present method works on any 3D model, generates the resulting image in real-time, allows the user to dynamically change views, and does not require user intervention.

10 Claims, 6 Drawing Sheets

Figure 1

(Prior Art)

REAL-TIME DIGITAL THREE DIMENSIONAL ENGRAVING

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention relates generally to computer graphics and, more specifically, to stylistic renderings of three-dimensional (3D) models.

2. Description

Figure 1:
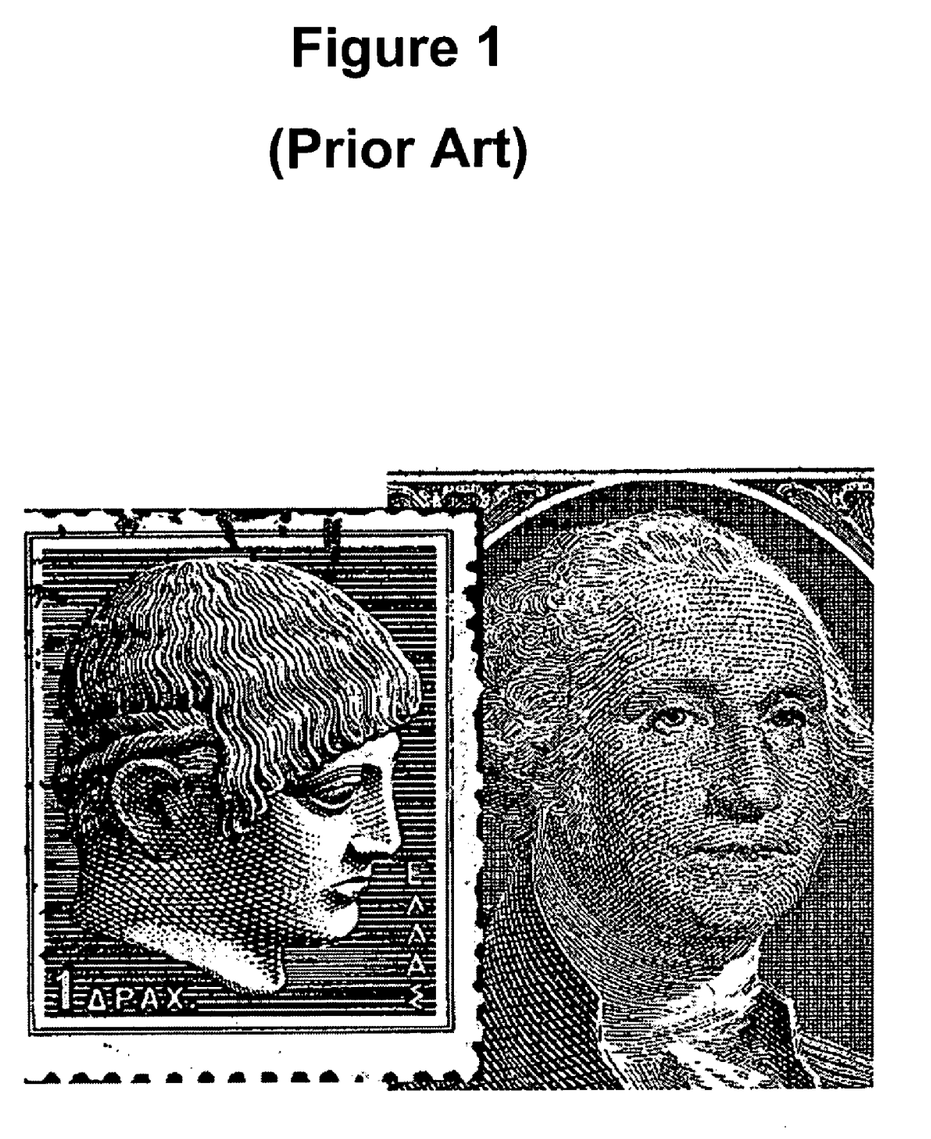
FIG. 1 illustrates two examples of traditional copperplate engravings (Prior Art)

Engraving is a traditional graphical technique used in various arts. If an artist wants to create a print from a copperplate engraving, the conventional method is to use a graver's tip to carve out a copperplate by making furrows in it. The furrows are filled with ink. The plate is then pressed onto paper or another medium to create the artwork. This is a time consuming process and any mistakes that are made during engraving are costly, because fixing errors may require the artist to start the engraving over with a new copperplate. FIG. 1 shows two examples of traditional copperplate engravings.

Modern computer graphics may be used to transform traditional engraving into a digital art through non-photo-realistic rendering (NPR) techniques. Unlike photo-realistic rendering techniques, the goal of NPR is to create an aesthetic experience that is deliberately unrealistic in such a way that the artist conveys to the user a feeling of personal style, sketchiness, incompleteness, fiction, or emotion. As examples, computer rendered charcoal prints can express the style of the artist; architectural blueprints are often rendered as sketchy to imply that they are simply a draft, and cartoon characters are rendered in such a manner as to convey fiction and humor. Various existing artistic styles may be adapted to NPR and used as stylistic rendering methods for computer-generated artwork. Digital engraving is one such technique being developed for content creation activities for original artwork, web pages, animated films and cartoons, computer games, and other applications.

One implementation of digital engraving that imitates traditional copperplate engraving for portraits is described in "Digital Facial Engraving", by Victor Ostromoukhov, of the Ecole Polytechnique Federale de Lausanne (EPFL), Switzerland, Proceedings of SIGGRAPH 1999, Los Angeles, Calif. Ostromoukhov's technique creates non-real-time digital engraving of two-dimensional (2D) images using a computer. This technique appears to work reasonably well for 2D images. Ostromoukhov's user-driven method of placing texture patches are true to form and in the spirit of facial engraving. However, there are at least several drawbacks to this method. Ostromoukhov's method requires user intervention to author an engraved image (e.g., it's a manual process), operates only on a single view in two dimensions, and cannot be performed in real-time.

Further advances in digital engraving techniques that overcome these and other disadvantages of the prior art would be valuable to digital content creators.

BRIEF DESCRIPTION OF THE DRAWINGS

The features and advantages of the present invention will become apparent from the following detailed description of the present invention in which.

DETAILED DESCRIPTION

An embodiment of the present invention is a method of generating real-time 3D digital engravings. The present invention provides a real-time digital engraving technique that mimics the style of traditional copperplate engraving such as is shown in FIG. 1. The present system accepts a 3D mesh comprising vertex data and applies a novel algorithm to generate a digital engraving image based on the mesh. The present method works on any 3D model, generates the resulting image in real-time, allows the user to dynamically change views, and does not require user intervention during generating and rendering of the image. Using the present invention, real-time 3D digital engravings may be generated for digital content creation purposes via widely used computer systems (such as personal computers (PCs)), rather than special purpose computer graphics engineering workstations and cumbersome manual techniques.

With the present invention, the artist can make mistakes and infinite modifications using different orientations and densities of a one-dimensional texture that is applied to the 3D mesh to achieve an infinite number of stylistic variations. In addition, because this is occurring using a 3D model, the result may be viewed from any angle. If the artist desires to create a copperplate from the digital engraving, the artist will have saved the more costly manufacturing time for only the final engraving, not intermediate designs. Hence, this technique may be useful in the context of an artist creating a work for hire. By using a 3D model and the present invention, the artist can vary the parameters to the digital engraving technique to suit the customer before delivering the actual copperplate. In addition, the present invention may be used generally for creation of any digital content whereby an engraving appearance is desired.

The present technique is also an inherently different style of rendering 3D geometry. This may be useful for content creators to break away from the photo-realistic styles that currently dominate computer games and 3D immersive applications. With the present invention, a new class of applications may capture different artistic styles through the use of digital engraving.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 2:
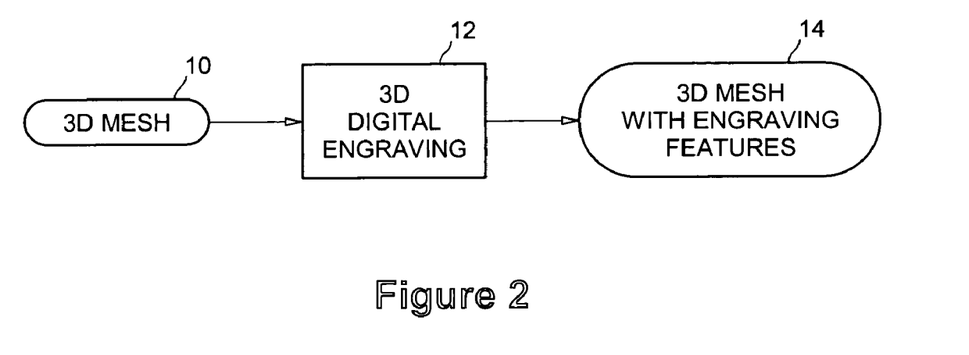
FIG. 2 is a diagram of a system providing digital engraving processing according to an embodiment of the present invention.
Figure 3:
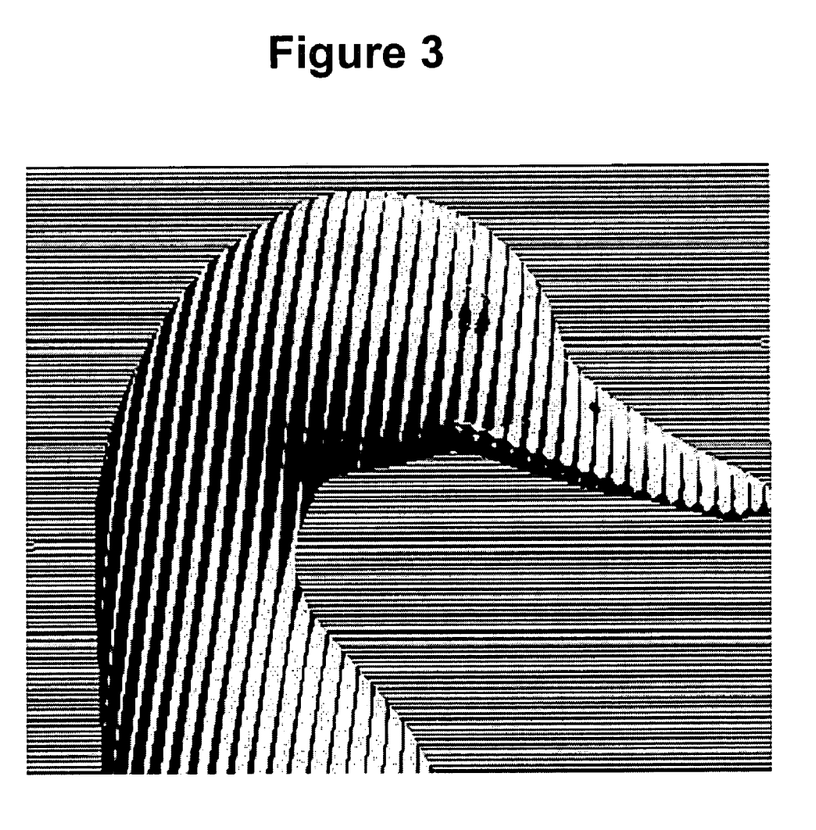
FIG. 3 is an example of an image having a single texture produced by digital engraving processing according to an embodiment of the present invention.

FIG. 2 is a diagram of a system providing digital engraving processing according to an embodiment of the present invention. A well-known data structure in computer graphics called a 3D mesh 10 may be input to 3D digital engraving processing module 12 to produce a 3D mesh with engraving features 14. The 3D mesh represents a three-dimensional model of one or more objects in a scene. The 3D mesh comprises a plurality of vertices along with information describing surfaces or faces of the mesh. 3D digital engraving processing module 12 analyzes the vertices and other information of the 3D mesh and transforms the mesh such that when the mesh is displayed the image includes features reminiscent of engraving. FIG. 3 is an example of an image having a single texture produced by digital engraving processing according to an embodiment of the present invention. Note how the image appears to have been produced using an engraving technique.

Figure 4:
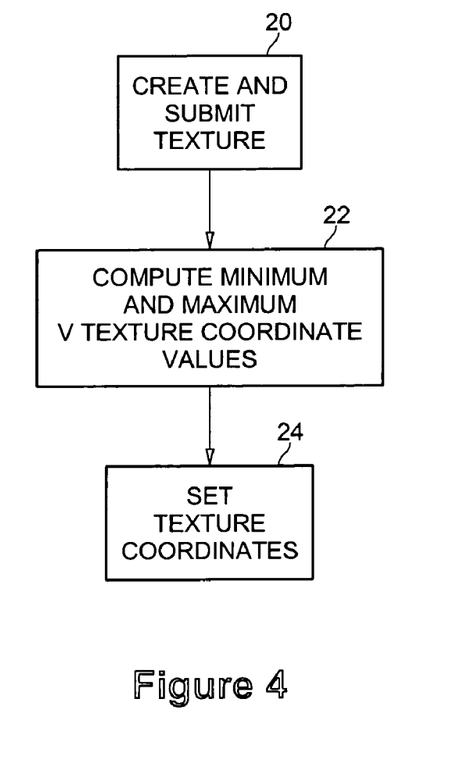
FIG. 4 is a flow diagram illustrating digital engraving processing according to an embodiment of the present invention.
Figure 5:
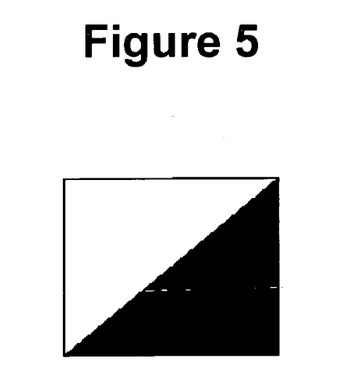
FIG. 5 is a sample texture used in digital engraving processing according to an embodiment of the present invention.

FIG. 4 is a flow diagram illustrating digital engraving processing according to an embodiment of the present invention. The digital engraving technique may be broken down into three steps. At block 20, digital engraving processing creates and submits a texture to a graphics application programming interface (API). The graphics API comprises software that interfaces with graphics hardware on a PC or other computer system. As is well-known in the art of computer graphics, application programs call procedures or functions provided by the graphics API to display objects and to control the appearance of the screen and objects on the screen. A texture comprises a pattern that may be applied to a surface of an object in the scene by a graphics rendering engine. The graphics API stores the texture in memory on graphics hardware. For purposes of the present invention, the texture comprises a two dimensional array of pixels (e.g., 2N by 2N, where N is a positive integer) that has pixels in a top diagonal half colored white, with the remaining pixels colored black. FIG. 5 shows this sample texture used in digital engraving processing according to an embodiment of the present invention. In one embodiment, N may be 5, thereby resulting in a texture of size 32 by 32 pixels. In other embodiments, other sizes of textures may be used. In other embodiments, other color combinations or patterns in the texture may also be used. The texture may be stretched, shrunk, overlaid, and repeated in various combinations during rendering to represent different one-dimensional textures on a 3D model. An example of block 20 implemented in the C++ programming language is shown in Appendix A, although block 20 may be implemented in other ways and in other programming languages without departing from the scope of the present invention.

Next, at block 22, digital engraving processing computes minimum and maximum V texture coordinates for the engraving. The minimum and maximum V texture coordinates may be computed once per mesh. Different engraving styles may be represented in the resulting image by changing the minimum and maximum values for the V texture coordinate. For the maximum V texture coordinate value, digital engraving processing multiplies the diffuse components of the light and the material colors of the mesh to produce a first value. The light components and material colors may be obtained from points in the 3D scene (e.g., on the mesh). Points on the mesh have stored color properties. This first computed value may be multiplied by a user-defined weighting factor and gated between 0 and 1. Next, the computed red (R), green (G), blue (B) color tuple may be averaged (e.g., (R+G+B)/3). The result may be used as the maximum V texture coordinate value for the engraving. The minimum V texture coordinate value may be computed as the maximum V texture coordinate value multiplied by a user-defined minimum weighting factor. With the present invention, the meshes are material separated so all vertices in a mesh have the same material properties. An example of block 22 implemented in the C++ programming language is shown in Appendix B, although block 22 may be implemented in other ways and in other programming languages without departing from the scope of the present invention.

In some embodiments, blocks 20 and 22 may be pre-processing steps that may be performed at initialization or start-up time. If the user desires to change any user-modifiable value in these steps, blocks 20 and 22 must be re-executed to have the modifications take effect for block 24. If the user desires color engraving, the black and/or white colors of the texture may be replaced with other colors. In one embodiment, the material color of the mesh may be determined and this color may be substituted for black in the texture.

At block 24, digital engraving processing sets the texture coordinates for each vertex of the mesh. Setting the texture coordinates may be implemented as a run-time process for operating on the input 3D mesh. For animation, setting of the texture coordinates must be performed for each frame of a sequence of frames during rendering of the scene. Setting of the texture coordinates comprises at least several operations.

Figure 6:
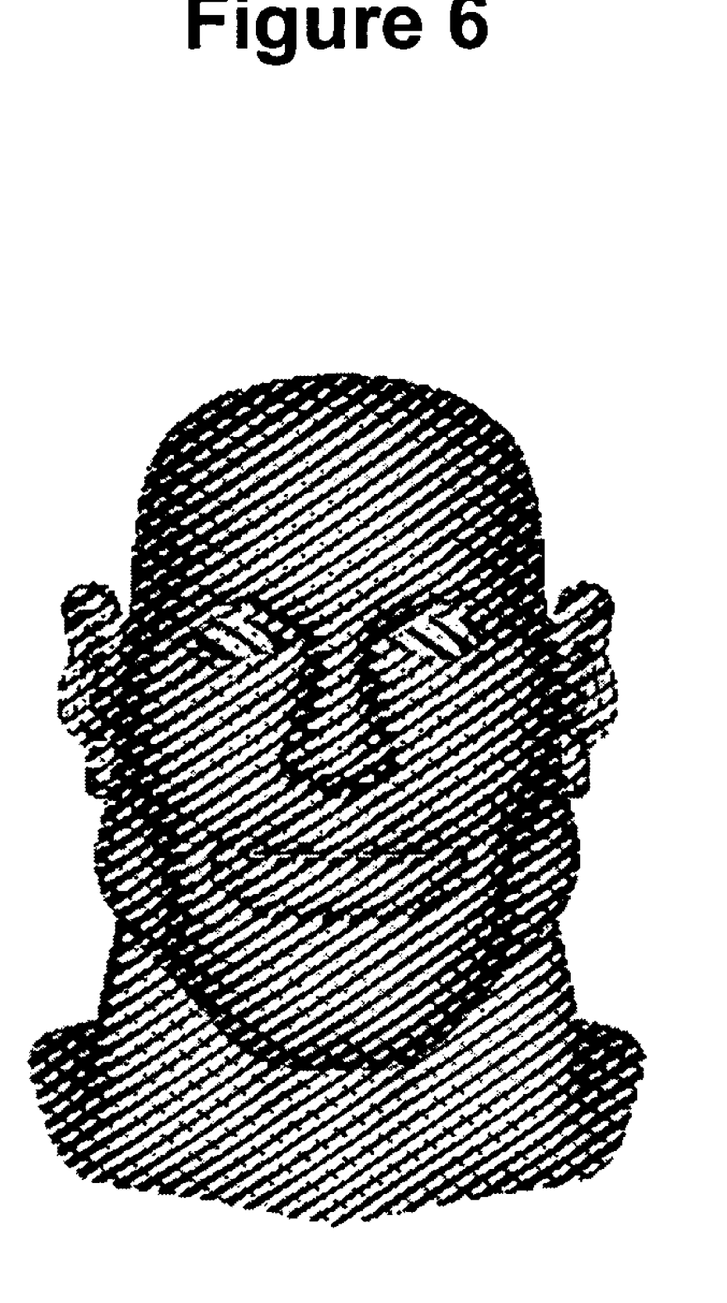
FIG. 6 is an example of an image having multiple textures and a single color produced by digital engraving processing according to an embodiment of the present invention.
Figure 7:
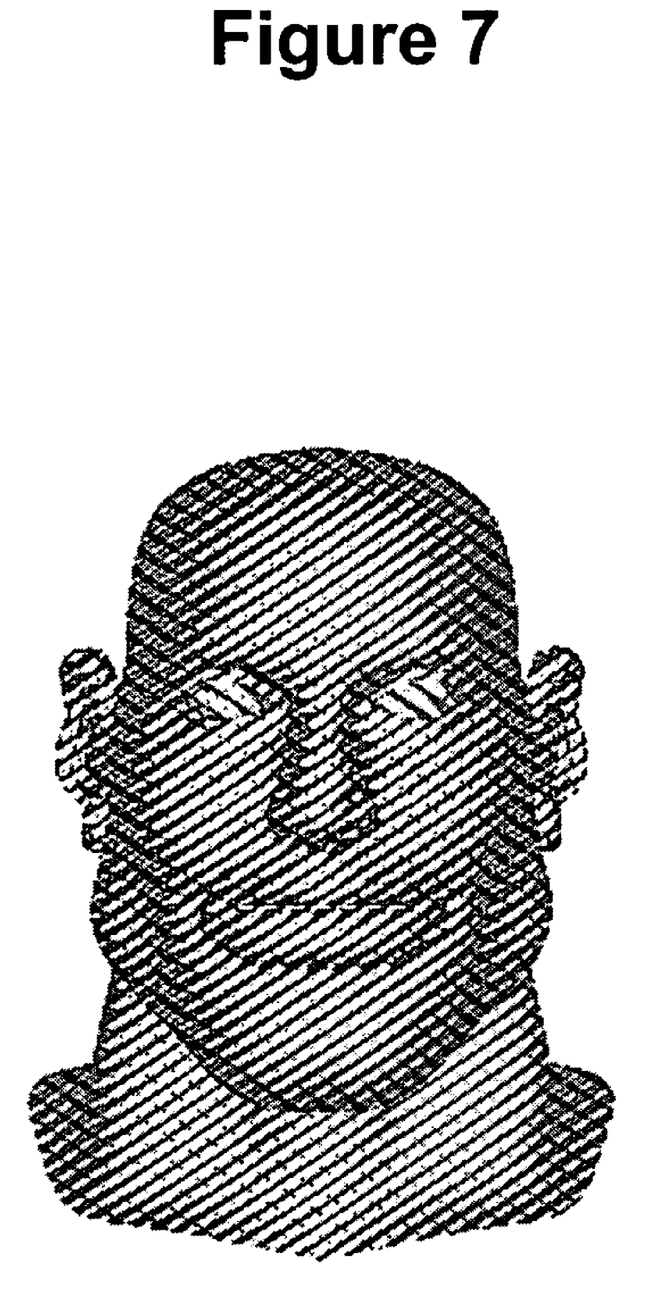
FIG. 7 is an example of an image having multiple textures and multiple colors produced by digital engraving processing according to an embodiment of the present invention.

First, digital engraving processing determines where the source of light is in the current scene. If no light source is present, the current viewpoint may be assumed to be the position of the light source. Next, digital engraving processing transforms the light source into the 3D mesh's coordinate system. That is, the light direction in light space may be converted to a light direction in world space, then the light direction in world space may be converted to a light direction in model space (e.g., the mesh's coordinate system). For each vertex in the 3D mesh, texture coordinates from a selected texture layer and the normal from the current vertex may be retrieved. In one embodiment, only a single texture layer may be used, but in other embodiments, multiple texture layers may be employed. A single texture layer is used in the example of FIG. 3, but multiple texture layers are used in the example of FIG. 6. Each texture layer may have an associated texture. The V texture coordinate for the first texture layer of the current vertex of the mesh may be set using the dot product of the light direction and the surface normal, gated to between the minimum and maximum V texture coordinate value determined in block 22. The coordinate pair (U, V) defines a point in the texture for each vertex. Each $U_i$, $V_j$ pair defines an index into the texture. Next, a pseudo-random or user-defined offset may be added to the V coordinate so that different materials in a group of meshes exhibit engraving lines in different directions. For example, FIG. 6 shows an image having multiple texture layers using black and white in the texture, and FIG. 7 shows the same image using multiple colors in the texture layers.

Notice that the eyes in each mesh have the engraving lines rotated in a different direction due to a user-defined or pseudo-random offset being applied to the V texture coordinate. In addition, so that the second texture layer may be seen, the second texture layer may be offset from the first texture layer.

The U coordinate of the texture coordinates for the current vertex of the mesh may then be computed. This may be accomplished by projecting the vertex of the mesh into 3D screen space, adding together the X and Y values of the projection, and multiplying by a tiling value that represents how dense the engraving is to appear. FIGS. 6 and 7 show the results of these techniques. In an alternate embodiment, the X and Y values may not be added together. Instead, either the X value or the Y value may be used individually and multiplied by the tiling value.

An example of block 24 implemented in the C++ programming language is shown in Appendix C, although block 24 may be implemented in other ways and in other programming languages without departing from the scope of the present invention.

Thus, the present technique enables artists and content creators to go beyond standard realistic rendering policies of traditional graphics APIs to provide engraving features for 3D models.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 8:
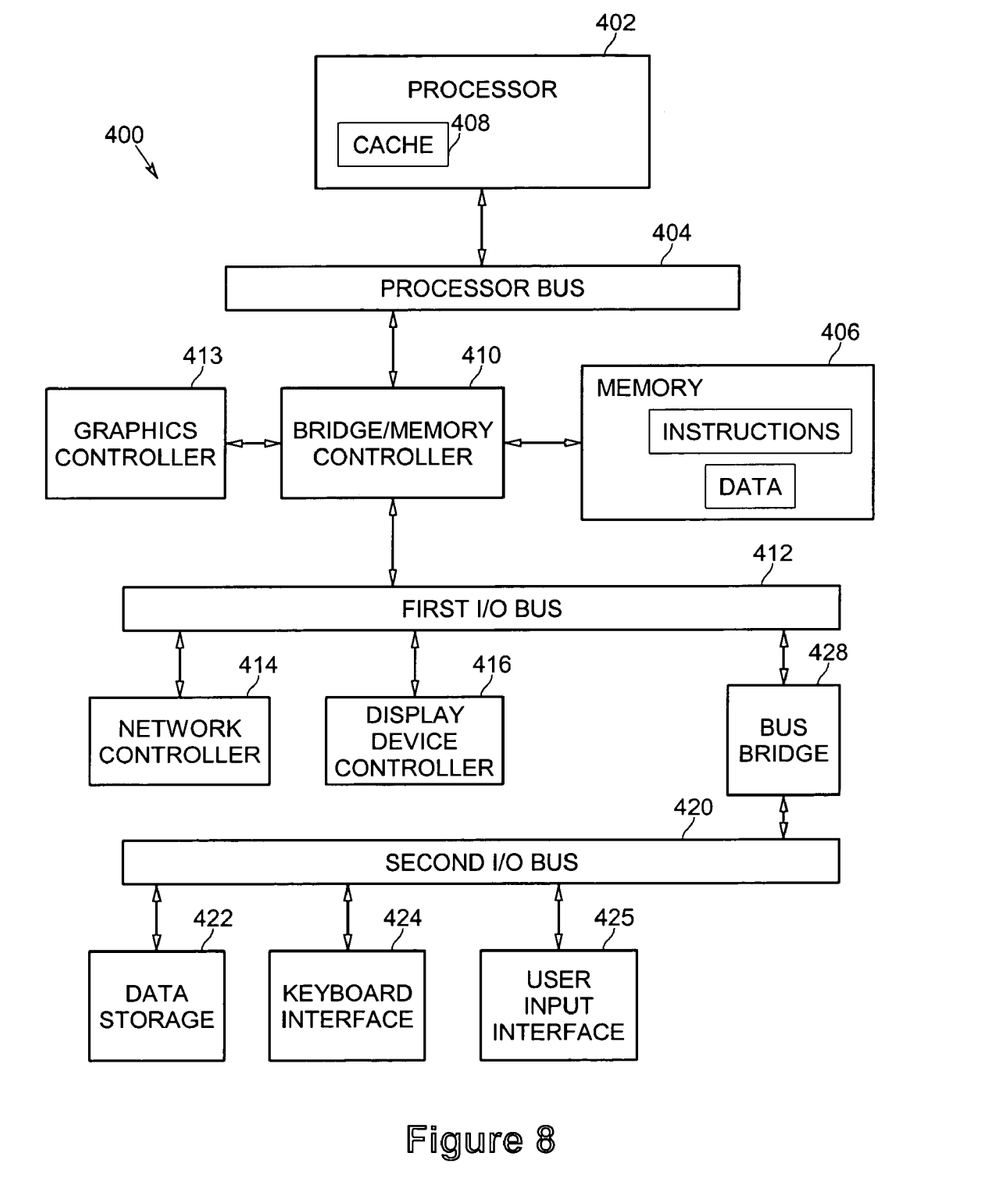
FIG. 8 is a diagram illustrating a sample processing system capable of being operated to provide digital engraving processing according to an embodiment of the present invention.

An example of one such type of processing system is shown in FIG. 8, however, other systems may also be used and not all components of the system shown are required for the present invention. Sample system 400 may be used, for example, to execute the processing for embodiments of the digital engraving system, in accordance with the present invention, such as the embodiment described herein. Sample system 400 is representative of processing systems based on the PENTIUM®II, PENTIUM® III and CELERON™ microprocessors available from Intel Corporation, although other systems (including personal computers (PCs) having other microprocessors, engineering workstations, other set-top boxes, and the like) and architectures may also be used.

FIG. 8 is a block diagram of a system 400 of one embodiment of the present invention. The system 400 includes a processor 402 that processes data signals. Processor 402 may be coupled to a processor bus 404 that transmits data signals between processor 402 and other components in the system 400.

System 400 includes a memory 406. Memory 406 may store instructions and/or data represented by data signals that may be executed by processor 402. The instructions and/or data may comprise code for performing any and/or all of the techniques of the present invention. Memory 406 may also contain additional software and/or data (not shown). A cache memory 408 may reside inside processor 402 that stores data signals stored in memory 406.

A bridge/memory controller 410 may be coupled to the processor bus 404 and memory 406. The bridge/memory controller 410 directs data signals between processor 402, memory 406, and other components in the system 400 and bridges the data signals between processor bus 404, memory 406, and a first input/output (I/O) bus 412. In this embodiment, graphics controller 413 interfaces to a display device (not shown) for displaying images rendered or otherwise processed by the graphics controller 413 to a user.

First I/O bus 412 may comprise a single bus or a combination of multiple buses. First I/O bus 412 provides communication links between components in system 400. A network controller 414 may be coupled to the first I/O bus 412. In some embodiments, a display device controller 416 may be coupled to the first I/O bus 412. The display device controller 416 allows coupling of a display device to system 400 and acts as an interface between a display device (not shown) and the system. The display device receives data signals from processor 402 through display device controller 416 and displays information contained in the data signals to a user of system 400.

A second I/O bus 420 may comprise a single bus or a combination of multiple buses. The second I/O bus 420 provides communication links between components in system 400. A data storage device 422 may be coupled to the second I/O bus 420. A keyboard interface 424 may be coupled to the second I/O bus 420. A user input interface 425 may be coupled to the second I/O bus 420. The user input interface may be coupled to a user input device, such as a remote control, mouse, joystick, or trackball, for example, to provide input data to the computer system. A bus bridge 428 couples first I/O bridge 412 to second I/O bridge 420.

Embodiments of the present invention are related to the use of the system 400 as a digital engraving system. According to one embodiment, such processing may be performed by the system 400 in response to processor 402 executing sequences of instructions in memory 404. Such instructions may be read into memory 404 from another computer-readable medium, such as data storage device 422, or from another source via the network controller 414, for example. Execution of the sequences of instructions causes processor 402 to execute digital engraving processing according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 400 perform their conventional functions in a manner well-known in the art. In particular, data storage device 422 may be used to provide long-term storage for the executable instructions and data structures for embodiments of the digital engraving system in accordance with the present invention, whereas memory 406 is used to store on a shorter term basis the executable instructions of embodiments of the digital engraving system in accordance with the present invention during execution by processor 402.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

APPENDIX A

```
© 2000 Intel Corporation
CreateAndSubmitEngravingTexture
IFXRESULT
CIFXShaderEngraver::CreateAndSubmitEngravingTexture(IFXRender-
Layer *pInRenderLayer, U32 inIndex)
{
    IFXRESULT status = IFX_OK;
    U8 *pTextureBytes = NULL;
    //fill in the texture bytes
    //setup texture to get filled in
    pTextureBytes = new U8[4*m_uResolution*m_uResolution];
    if(pTextureBytes == NULL)
        status = IFX_E_INVALID_POINTER;
    //now, fill it in
    U32 uRow = 0;
    U32 uCol = 0;
    //TODO: these are backwards!! row <--> col
    if(m_uStyle ==
IFX_SHADE_STYLE_BLACK_AND_WHITE_ENGRAVING)
    {
        for(uRow = 0; uRow < m_uResolution; uRow++ )
        {
            for(uCol = 0; uCol < m_uResolution; uCol++)
            {
                if(uRow < uCol) //makes a diagonal:)
                {
pTextureBytes[uRow*m_uResolution*4+uCol*4 ] = 255;
pTextureBytes[uRow*m_uResolution*4+uCol*4+1] = 255;
pTextureBytes[uRow*m_uResolution*4+uCol*4+2] = 255;
pTextureBytes[uRow*m_uResolution*4+uCol*4+3] = 0;
                }
                else
                {
pTextureBytes[uRow*m_uResolution*4+uCol*4 ] = 0;
pTextureBytes[uRow*m_uResolution*4+uCol*4+1] = 0;
pTextureBytes[uRow*m_uResolution*4+uCol*4+2] = 0;
pTextureBytes[uRow*m_uResolution*4+uCol*4+3] = 0;
                }
            }
        }
    }
    else
    {
        //retrieve the material id
```

APPENDIX A-continued

```
        //retrieve the material color
        //use this to create the texture
    }
    //next, set up the texture object and store the identifier
    U32 texID = -1;
    if(status == IFX_OK)
    {
        //setup texturing by doing the following:
        //Set the texture up
        status = pInRenderLayer->GetFreeTextureID(&texID);
        if(status == IFX_OK)
        {
            //then use SetTextureData and set the other params (filter,
coordinates, etc)
            CIFXBufferFormat bufferFormat;
            bufferFormat.m_eType =
bufferFormat.CIFXBufferFormat::IFX_BUFFER_RGB;
            bufferFormat.m_uBytesPerPixel    = 4;
            bufferFormat.m_uRedBitsPerPixel  = 8;
            bufferFormat.m_uGreenBitsPerPixel = 8;
            bufferFormat.m_uBlueBitsPerPixel = 8;
            bufferFormat.m_uAlphaBitsPerPixel = 8;
            pInRenderLayer->SetTextureData (texID, 0, bufferFormat,
bufferFormat, m_uResolution, m_uResolution, pTextureBytes);
            pInRenderLayer->SetTextureCoordMode (texID,
IFXRenderLayer::IRL_TEXTURE_U
IFXRenderLayer::IRL_TEXTURE_REPEAT);
            pInRenderLayer->SetTextureCoordMode (texID,
IFXRenderLayer::IRL_TEXTURE_V,
IFXRenderLayer::IRL_TEXTURE_REPEAT);
            pInRenderLayer->SetTextureFilterMIN (texID,
IFXRenderLayer::IRL_TEXTURE_LINEAR);
            pInRenderLayer->SetTextureFilterMAG (texID,
IFXRenderLayer::IRL_TEXTURE_LINEAR);
            if(status == IFX_OK)
            {
                m_pTexIDs[inIndex] = texID;
            }
        }
    }
    //Texture bits have been given to the render layer, we can release them
    if(pTextureBytes != NULL)
    {
        delete [ ] pTextureBytes;
        pTextureBytes = NULL;
    }
    return status;
}
```

APPENDIX B

```
© 2000 Intel Corporation
ComputeMinAndMaxVTextureCoordinate
IFXRESULT
CIFXShaderEngraver::ComputeMinAndMaxVTextureCoordinate(IFX-
MaterialResource *pInIFXMaterialResource,
    IFXLight         **ppInLightList,
    F32              *fOutMinVTextureCoordinate,
    F32              *fOutMaxVTextureCoordinate)
{
    IFXRESULT status = IFX_OK;
    //Get lights and material colors for min and max V texture //coordinate
values
    IFXSGVector diffuseLightColor;
    IFXLight *pLight = NULL;
    IFXLightResource *pIFXDiffuseLightResource = NULL;
    pLight = ppInLightList[0];
    if(pLight == NULL)
        status = IFX_E_INVALID_POINTER;
    if(status == IFX_OK)
    {
        //retrieve the lights
        status = pLight->GetLightResource(&pIFXDiffuseLightResource);
    }
    if(status == IFX_OK)
    {
```

APPENDIX B-continued

```
        status = pIFXDiffuseLightResource->GetColor(&diffuseLightColor);
        //grab the material colors for this set of meshes
        IFXSGVector ambientMaterialColor;
        IFXSGVector diffuseMaterialColor;
        pInIFXMaterialResource->GetAmbient(&ambientMaterialColor);
        pInIFXMaterialResource->GetDiffuse(&diffuseMaterialColor);
        IFXSGVector illuminatedDiffuseColor;
        illuminatedDiffuseColor      = diffuseLightColor *
diffuseMaterialColor;
        //finally, multiply by highlightFactor as a bias
        illuminatedDiffuseColor *= m__uHighlightFactor;
        //cap the min and max values
        if(illuminatedDiffuseColor.R( ) < 0.0) illuminatedDiffuseColor[0] =
0.0;
        if(illuminatedDiffuseColor.G( ) < 0.0) illuminatedDiffuseColor[1] =
0.0;
        if(illuminatedDiffuseColor.B( ) < 0.0) illuminatedDiffuseColor[2] =
0.0;
        if(illuminatedDiffuseColor.R( ) > 1.0) illuminatedDiffuseColor[0] =
1.0;
        if(illuminatedDiffuseColor.G( ) > 1.0) illuminatedDiffuseColor[1] =
1.0;
        if(illuminatedDiffuseColor.B( ) > 1.0) illuminatedDiffuseColor[2] =
1.0;
        //average them together for a scalar to use later
        *fOutMaxVTextureCoordinate = illuminatedDiffuseColor.R( ) +
illuminatedDiffuseColor.G( ) + illuminatedDiffuseColor.B( );
        *fOutMaxVTextureCoordinate /= 3;
        //*fOutMaxVTextureCoordinate = .25;
        IFXSG Vector shadowedDiffuseColor;
        //since we currently don't sum up all ambient terms,
        //we will assume a default shadow color 'dimmed' from the
        illuminated //diffuse
        shadowedDiffuseColor = .2f * illuminatedDiffuseColor;
        //finally, multiply by shadowFactor as a bias
        shadowedDiffuseColor *= m__uShadowFactor;
        //cap the min and max values
        if(shadowedDiffuseColor.R( ) < 0.0) shadowedDiffuseColor[0] = 0.0;
        if(shadowedDiffuseColor.G( ) < 0.0) shadowedDiffuseColor[1] =
0.0;
        if(shadowedDiffuseColor.B( ) < 0.0) shadowedDiffuseColor[2] = 0.0;
        if(shadowedDiffuseColor.R( ) > 1.0) shadowedDiffuseColor[0] = 1.0;
        if(shadowedDiffuseColor.G( ) > 1.0) shadowedDiffuseColor[1] =
1.0;
        if(shadowedDiffuseColor.B( ) > 1.0) shadowedDiffuseColor[2] = 1.0;
        //average them together for a scalar to use later
        *fOutMinVTextureCoordinate = shadowedDiffuseColor.R( ) +
shadowedDiffuseColor.G( ) + shadowedDiffuseColor.B( );
        *fOutMinVTextureCoordinate /= 3;
        //*fOutMinVTextureCoordinate /= 2;
    }
    return status;
}
```

APPENDIX C

```
© 2000 Intel Corporation
SetTextureCoordinates
IFXRESULT CIFXShaderEngraver::SetTextureCoordinates(
    IFXRenderLayer   *pInRenderLayer,
    IFXMesh          *pInMesh,
    IFXSGMatrix      *pInMeshToWorldMatrix,
    U32              uInNumberOfLights,
    IFXLight         **ppInLightList,
    IFXMaterialResource *pInIFXMaterialResource)
{
    IFXRESULT status = IFX_OK;
    if(pInMesh == NULL)        status = IFX_E_INVALID_POINTER;
    if(pInMeshToWorldMatrix == NULL) status = IFX_E_INVALID_
POINTER;
    if(uInNumberOfLights < 1)  status = IFX_E_INVALID_RANGE;
    if(ppInLightList == NULL)  status = IFX_E_INVALID_POINTER;
    // 1: Grab the lightToWorld Matrix
    //first, grab the closest light to the mesh
    IFXLight *localLight = ppInLightList[0];
    IFXSGMatrix lightToWorldMatrix;
```

APPENDIX C-continued

```
    if(status == IFX_OK)
    {
        F32 fMinVTextureCoordinate;
        F32 fMaxVTextureCoordinate;
        // next, grab the lightToWorldMatrix
        status = localLight->GetMatrix(&lightToWorldMatrix);
        ////////////////////////////////////////////////////////////////
        // [2] Convert light direction in light space to light direction in world
space
        ////////////////////////////////////////////////////////////////
        IFXSGVector lightDirectionInLightSpace;
        //light direction points down light −z axis
        lightDirectionInLightSpace.set(0, 0, −1);
        //xform to world space
        //MATRIX * VEcTOR ALWAYS!!!!!
        IFXSGVector lightDirectionInWorldSpace;
        lightDirectionInWorldSpace = lightToWorldMatrix *
lightDirectionInLightSpace;
        ////////////////////////////////////////////////////////////////
        // [3] Convert the light direction in world space to the light direction
in model space
        ////////////////////////////////////////////////////////////////
        IFXSGMatrix *meshToWorldMatrix = pInMeshToWorldMatrix;
        //meshToWorld.inverse = WorldToMesh matrix :)
        IFXSGVector lightDirectionInModelSpace;
        lightDirectionInModelSpace = meshToWorldMatrix->inverse( ) *
lightDirectionInWorldSpace;
        lightDirectionInModelSpace.normalize( );
        //convert from IFXSGVector to IFXVector3
        IFXVector3 lightDirectionInModelSpaceVector;
        lightDirectionInModelSpaceVector[0] =
lightDirectionInModelSpace.x;
        lightDirectionInModelSpaceVector[1] =
lightDirectionInModelSpace.y;
        lightDirectionInModelSpaceVector[2] =
lightDirectionInModelSpace.z;
        //computes m__fMinVTextureCoordinate and
    //m__fMaxVTextureCoordinate
        //TODO: want to be done only once and when the material
resource has changed
        if(status == IFX_OK)
        status =
ComputeMinAndMaxVTextureCoordinate(pInIFXMaterialResource,
ppInLightList, &fMinVTextureCoordinate, &fMaxVTextureCoordinate);
        ////////////////////////////////////////////////////////////////
        // [5] Loop over all of the vertices, setting the dot product for each
U coordinate
        ////////////////////////////////////////////////////////////////
        if(status == IFX_OK)
        {
            IFXVertexIter vIter;
            pInMesh->GetVertexIter(&vIter);
            U32 numVertices = pInMesh->GetNumVertices( );
            for(U32 uVertexIndex = 0;uVertexIndex <
numVertices;uVertexIndex++)
            {
                IFXVector2 *pTexCoord0 = NULL;
                IFXVector2 *pTexCoord1 = NULL;
                IFXVector3 *pNormal = NULL;
                IFXVector3 *pVedex = NULL;
                pNormal    = vIter.GetNormal( );
                pTexCoord0 = vIter.GetTexCoord(0);
                pTexCoord1 = vIter.GetTexCoord(1);
                pVertex    = vIter.GetPosition( );
                //Here is the math
                pTexCoord0->V( ) = pNormal-
>DotProduct(lightDirectionInModelSpaceVector);
                if       (pTexCoord0->V( ) < fMinVtextureCoordinate)
                             pTexCoord0->V( ) = fMinVTextureCoordinate;
                else if  (pTexCoord0->V( ) > fMaxVTextureCoordinate)
                             pTexCoord0->V( ) = fMaxVTextureCoordinate;
                //TODO: probably want this to vary per mesh !!
                pTexCoord1->V( ) = pTexCoord0->V( ) + 0.2f;
                pTexCoord0->V( ) = pTexCoord0->V( ) − 0.2f;
                //project point to screen for U value
                F32 fPositionInModelSpace[3];
                fPositionInModelSpace[0] = pVertex->X( );
                fPositionInModelSpace[1] = pVertex->Y( );
                fPositionInModelSpace[2] = pVertex->Z( );
```

APPENDIX C-continued

```
        F32 fPositionInScreenSpace[2];
        pInRenderLayer-
>ProjectPoint2(fPositionInModelSpace, fPositionInScreenSpace);
        pTexCoord0->U( ) =
          fPositionInScreenSpace[0] * m__fTiling +
        fPositionInScreenSpace[1] * m__fTiling;
        pTexCoord1->U( ) =
        fPositionInScreenSpace[0] * m__fTiling -
        fPositionInScreenSpace[1] * m__fTiling;
        //go to the next vertex and do the same thing
        vIter.Next( );
      } //end for
    }//end if(status == IFX_OK)
  } //end if(status == IFX_OK)
  return status;
}
```

What is claimed is:

1. A method for displaying a three-dimensional (3D) digital engraving image comprising:
 creating a texture for application to a 3D mesh of the 3D digital engraving image, the texture including a two dimensional array of pixels having a top diagonal half colored a first color with remaining pixels of the array colored a second color;
 determining minimum and maximum V texture coordinate values for vertices of the 3D mesh;
 setting texture coordinates (U, V) of each vertex of the 3D mesh; and
 displaying the 3D digital engraving image;
 wherein setting the texture coordinates (U, V) includes:
  determining a source of light in a scene represented by the 3D mesh,
  transforming the light source into the 3D mesh's coordinate system, and
  for each vertex of the 3D mesh, retrieving texture coordinates from a selected texture layer and a normal of the vertex, computing a V texture coordinate using the dot product of the light direction and the normal, and setting the V texture coordinate between the minimum and maximum V texture coordinate values.

2. The method of claim 1, further comprising submitting the texture to a graphics application programming interface.

3. The method of claim 1, further comprising performing at least one of stretching, shrinking, overlaying, or repeating the texture during application of the texture to the 3D mesh.

4. The method of claim 1, further comprising adding an offset to the V texture coordinate to change a direction of an engraving line in the 3D digital engraving image.

5. The method of claim 1, further comprising determining the U texture coordinate for a vertex of the 3D mesh by projecting the vertex into 3D screen space, adding together X and Y values of the projection, and multiplying the sum by a tiling value representing density of the 3D digital engraving image.

6. An article comprising: a storage medium having a plurality of machine readable instructions, wherein when the instructions are executed by a processor, the instructions provide for:
 displaying a three-dimensional (3D) digital engraving image by creating a texture for application to a 3D mesh of the 3D digital engraving image, the texture including a two dimensional array of pixels having a top diagonal half colored a first color with remaining pixels of the array colored a second color;
 determining minimum and maximum V texture coordinate values for vertices of the 3D mesh;
 setting texture coordinates (U, V) of each vertex of the 3D mesh; and
 displaying the 3D digital engraving image;
 wherein setting the texture coordinates (U, V) includes:
  determining a source of light in a scene represented by the 3D mesh,
  transforming the light source into the 3D mesh's coordinate system, and
  for each vertex of the 3D mesh, retrieving texture coordinates from a selected texture layer and a normal of the vertex, computing a V texture coordinate using the dot product of the light direction and the normal, and setting the V texture coordinate between the minimum and maximum V texture coordinate values.

7. The article of claim 6, further comprising instructions for submitting the texture to a graphics application programming interface.

8. The article of claim 6, further comprising instructions for performing at least one of stretching, shrinking, overlaying, or repeating the texture during application of the texture to the 3D mesh.

9. The article of claim 6, further comprising instructions for adding an offset to the V texture coordinate to change a direction of an engraving line in the 3D digital engraving image.

10. The article of claim 6, further comprising instructions for determining the U texture coordinate for a vertex of the 3D mesh by projecting the vertex into 3D screen space, adding together X and Y values of the projection, and multiplying the sum by a tiling value representing density of the 3D digital engraving image.

* * * * *